Patented Apr. 1, 1924.

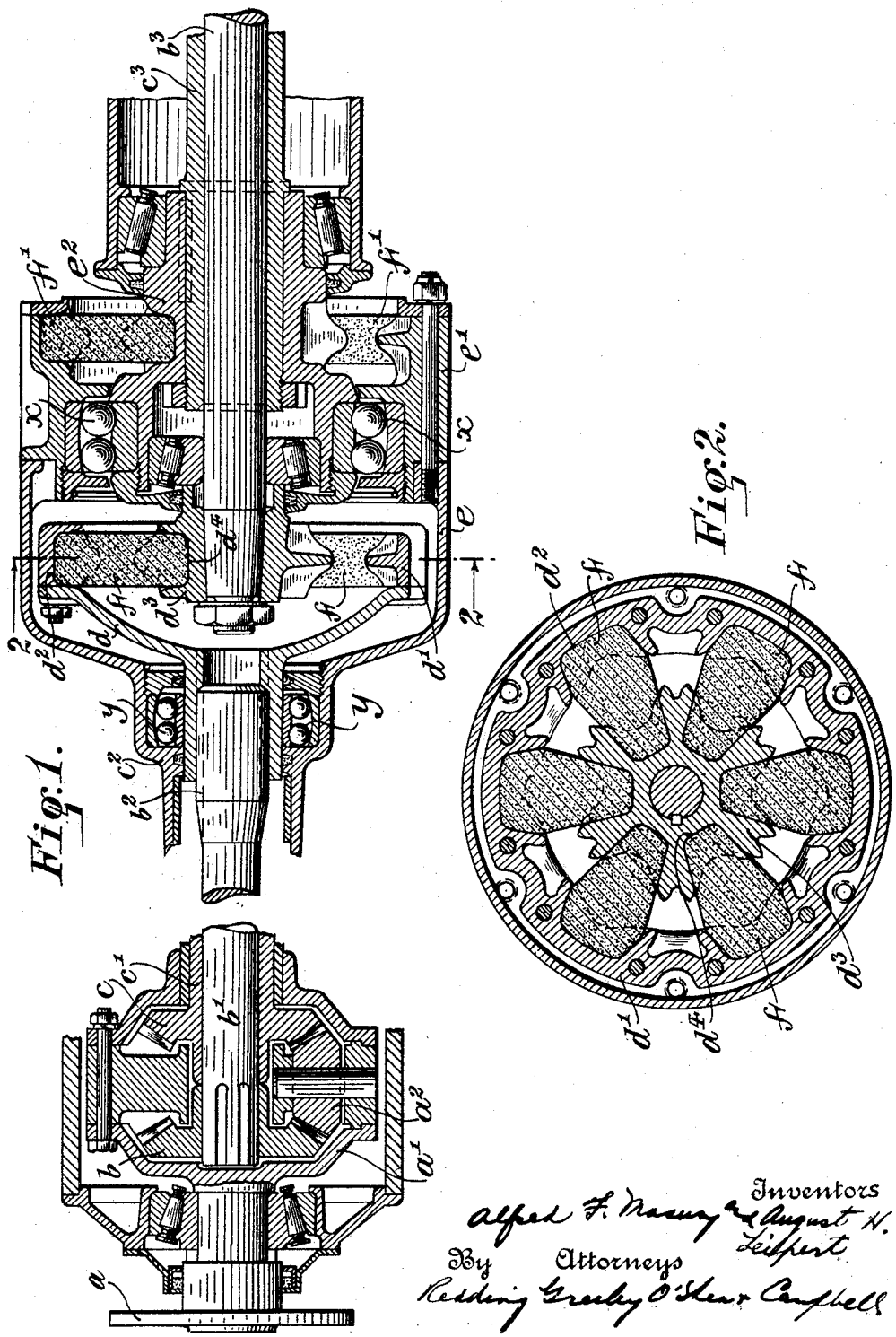

1,488,509

UNITED STATES PATENT OFFICE.

ALFRED F. MASURY AND AUGUST H. LEIPERT, OF NEW YORK, N. Y., ASSIGNORS TO INTERNATIONAL MOTOR COMPANY, OF NEW YORK, N. Y., A CORPORATION OF DELAWARE.

DOUBLE UNIVERSAL JOINT AND TORQUE-CUSHIONING DEVICE.

Application filed September 6, 1923. Serial No. 661,135.

*To all whom it may concern:*

Be it known that we, ALFRED F. MASURY and AUGUST H. LEIPERT, of the borough of Manhattan and of the borough of Queens, respectively, of the city of New York, in the State of New York, have invented certain new and useful Improvements in Double Universal Joints and Torque-Cushioning Devices, of which the following is a specification, reference being had to the accompanying drawing, forming a part hereof.

This invention relates to universal joints and more particularly to universal joints embodied in rear drives for motor vehicles operating generally in accordance with the principles disclosed in Letters Patent of the United States No. 1,402,301. In the patent there is disclosed a differential gear operatively interposed between the propeller shaft and each of a plurality of differential gears provided in connection with each pair of live axle sections. More particularly the driving gears of the first mentioned differential gear are engaged operatively with two concentric shafts, each of which is adapted to transmit driving forces by suitable gearing from the propeller shaft to the differential gear associated with each pair of live axle sections. In operation the propeller shaft is likely to be subjected to frequent tortional stresses under conditions of sudden load. Movements of the rear axle and frame distortion are likely to subject the propeller shaft to bending moments. It is an object of the present invention to provide a universal joint which will absorb tortional stresses and prevent their transmission and which will accommodate itself to the relative movements of the parts connected thereby. Accordingly blocks of yielding non-metallic material are interposed operatively between the driving and driven elements of the universal joint. Preferably the blocks are formed of rubber and are retained under internal static pressure. By so retaining the blocks their resiliency and strength is increased and the life of the block materially prolonged. It is a further object of the invention to compensate for movements of the rear axle and for frame distortion in the rear drive disclosed in the said Letters Patent so that the propeller shaft is not subjected to bending moments. Accordingly the concentric shafts driven by the differential gear which is associated with the propeller shaft are formed in sections and universal joints are operatively interposed between the sections. Another object of the invention is to cushion tortional stresses arising under conditions of sudden load and prevent their sudden transmission to the propeller shaft of the patented rear drive. Accordingly the universal joints operatively interposed between the sections of the shafts take the form of the improvements described hereinbefore and include blocks of yielding non-metallic material which cushion the tortional stresses arising from sudden starting and stopping of the vehicle.

A preferred embodiment of the invention will now be described with greater particularity in connection with the accompanying drawings, in which;

Figure 1 is a sectional view of the dual rear drive of a motor vehicle showing the interposition of universal joints according to the present invention.

Figure 2 is a sectional view of one of the universal joints of the present invention taken on the plane indicated by the line 2—2 of Figure 1 and looking in the direction of the arrows.

In the drawing only so much of the dual rear drive disclosed in Letters Patent of the United States No. 1,402,301 is described as is necessary to an understanding of the invention. The gearing transmitting driving torque from the concentric shafts to the differential of the live axle sections of the rear wheels is not shown as this gearing may take various forms in different circumstances. For an understanding of the manner in which each pair of live axle sections is propelled according to the principles disclosed in the patent, it is pointed out that the propeller shaft $a$ carries therewith or has secured thereto a differential housing $a'$ in which are supported a plurality of planetary pinions $a^2$ revoluble therewith. These pinions mesh with driving gears $b$, $c$ in a manner commonly employed in differential gears of this type, one of these driving gears being keyed to a shaft $b'$ which is operatively connected with one set of the live axle sections, say the rearwardly disposed ones. The other driving gear $c$ is carried with or otherwise secured to a hollow shaft $c'$ through which the shaft $b'$ extends and which is operatively connected to the other set of live axle sections, say the forwardly disposed ones.

The concentric shafts $b'$, $c'$ are formed in two sections $b^2$, $c^2$ and $b^3$, $c^3$, respectively, and the respective sections are coupled by yielding elements which not only transmit driving torque between the sections but compensate for movements of the rear axles and for frame distortion and relieve the propeller shaft of bending moments. Self aligning bearings $f$ between the concentric sections $b^3$, $c^3$ and an element carried with the hollow shaft $c^2$ permit an angular movement of the shaft $b^3$, $c^3$ with respect to shafts $b^2$, $c^2$, respectively. A self aligning bearing $y$ may also be disposed between the end of solid shaft $b^2$ and hollow shaft $c^2$ to afford relative angular movement therebetween. In the illustrative embodiment the end of section $b^2$ opposite to that carrying the gear $b$ has secured thereto one element $d$ of a universal joint. This element may take the form of a spider or a hemispherical member keyed or otherwise secured to the end of the shaft. To member $d$ is bolted an annular housing $d'$. The proximate end of the other section $b^3$ carries a member $d^3$ as shown. Driving torque is transmitted between members $d'$ and $d^3$ by means of blocks $f$ of yielding non-metallic material, such as rubber. These blocks may be retained between seats $d^2$ formed on the member $d$ and cooperating seats $d^4$ formed on the member $d^3$. The blocks are preferably made of a size such that they are retained in the seats under internal static pressure whereby the strength, resiliency and wearing qualities of the material are materially increased.

A universal joint is similarly interposed between the sections of the hollow shaft $c'$. Formed on or secured to the end of section $c^2$ opposite to that carrying the gear $c$ is a housing $e$ shown as having bolted thereto an annular member $e'$. A cooperating member $e^2$ is carried with the proximate end of the hollow shaft section $c^3$. Members $e'$ and $e^2$ may be formed with cooperating seats similar to those illustrated in connection with the members $d'$ and $d^3$ and between these seats may be disposed blocks $f'$ of yielding non-metallic material such as rubber similar to the blocks $f$. These blocks are preferably also retained under internal static pressure for the purpose previously specified.

It will be apparent in the construction just described that the universal joints between the sections of concentric shafting provide for universal movement therebetween and prevent the impression of any bending moments upon the propeller shaft and its allied gearing and that the blocks of yielding non-metallic material embodied in the universal joints not only facilitate their universal movement but cushion all tortional stresses which are transmitted by the shafts.

Various changes in structure and design will occur to those skilled in the art and no limitation is intended by the foregoing description except as indicated in the appended claims.

What we claim is:

1. In power transmission devices, a sectional solid shaft, a sectional hollow shaft concentric therewith, means to drive said shafts, and means to connect the respective shaft sections including blocks of non-metallic yielding material.

2. In power transmission devices, a sectional solid shaft, a sectional hollow shaft concentric therewith, means to drive said shafts, and means to connect the respective shaft sections including blocks of non-metallic yielding material retained under compression.

3. In power transmission devices, a sectional solid shaft, a sectional hollow shaft concentric therewith, means to drive said shafts, and means to permit relative angular movement between the respective shaft sections.

4. In power transmission devices, a sectional solid shaft, a sectional hollow shaft concentric therewith, means to drive said shafts, self aligning bearings to permit relative angular movement between the shaft sections and means to connect the respective shaft sections comprising blocks of non-metallic yielding material.

5. In power transmission devices, a sectional solid shaft, a sectional hollow shaft concentric therewith, a differential gear including planetary pinions, a propeller shaft connected with said planetary pinions, two driving gears engaged by said pinions, one of said gears being keyed to said solid shaft, the other of said gears being keyed to the hollow shaft, and means to connect the shaft sections comprising blocks of non-metallic yielding material.

6. In power transmission devices, a sectional solid shaft, a sectional hollow shaft concentric therewith, a differential gear including planetary pinions, a propeller shaft connected with said planetary pinions, two driving gears engaged by said pinions, one of said gears being keyed to said solid shaft, the other of said gears being keyed to the hollow shaft, self aligning bearings to permit relative angular movement between the sets of shaft sections, and means to connect the shaft sections comprising blocks of non-metallic yielding material.

7. In a rear drive for motor vehicles, a sectional solid shaft, a sectional hollow shaft concentric therewith, a differential gear including planetary pinions, a propeller shaft connected with said planetary pinions, two driving gears engaged by said pinions, one of said gears being keyed to said solid shafts, the other of said gears being keyed to said hollow shaft, an annular member carried with the end of one section of the solid shaft, a member carried with the adjacent end of the proximate solid shaft section, blocks of yielding non-metallic material retained under compression between said members, an annular member carried with the end of a section of the hollow shaft, a member secured to the adjacent end of the proximate hollow shaft section, and blocks of yielding non-metallic material retained under compression between said members.

8. In a rear drive for motor vehicles, a sectional solid shaft, a sectional hollow shaft concentric therewith, a differential gear including planetary pinions, a propeller shaft connected with said planetary pinions, two driving gears engaged by said pinions, one of said gears being keyed to said solid shaft, the other of said gears being keyed to said hollow shaft, an annular member carried with the end of one section of the solid shaft, a member carried with the adjacent end of the proximate solid shaft section, seats on said annular member, cooperating seats on said second named member, blocks of rubber retained under compression in said seats, an annular member carried with the end of a section of the hollow shaft, a member carried with the adjacent end of the proximate hollow shaft section, seats on said annular member, cooperating seats on said last named member and blocks of rubber retained under compression in said seats.

This specification signed this 4th day of Sept. A. D. 1923.

ALFRED F. MASURY.
AUGUST H. LEIPERT.